E. J. GOODE.
MOTOR PLOW AND CULTIVATOR.
APPLICATION FILED JULY 11, 1918.
1,298,329.
Patented Mar. 25, 1919.
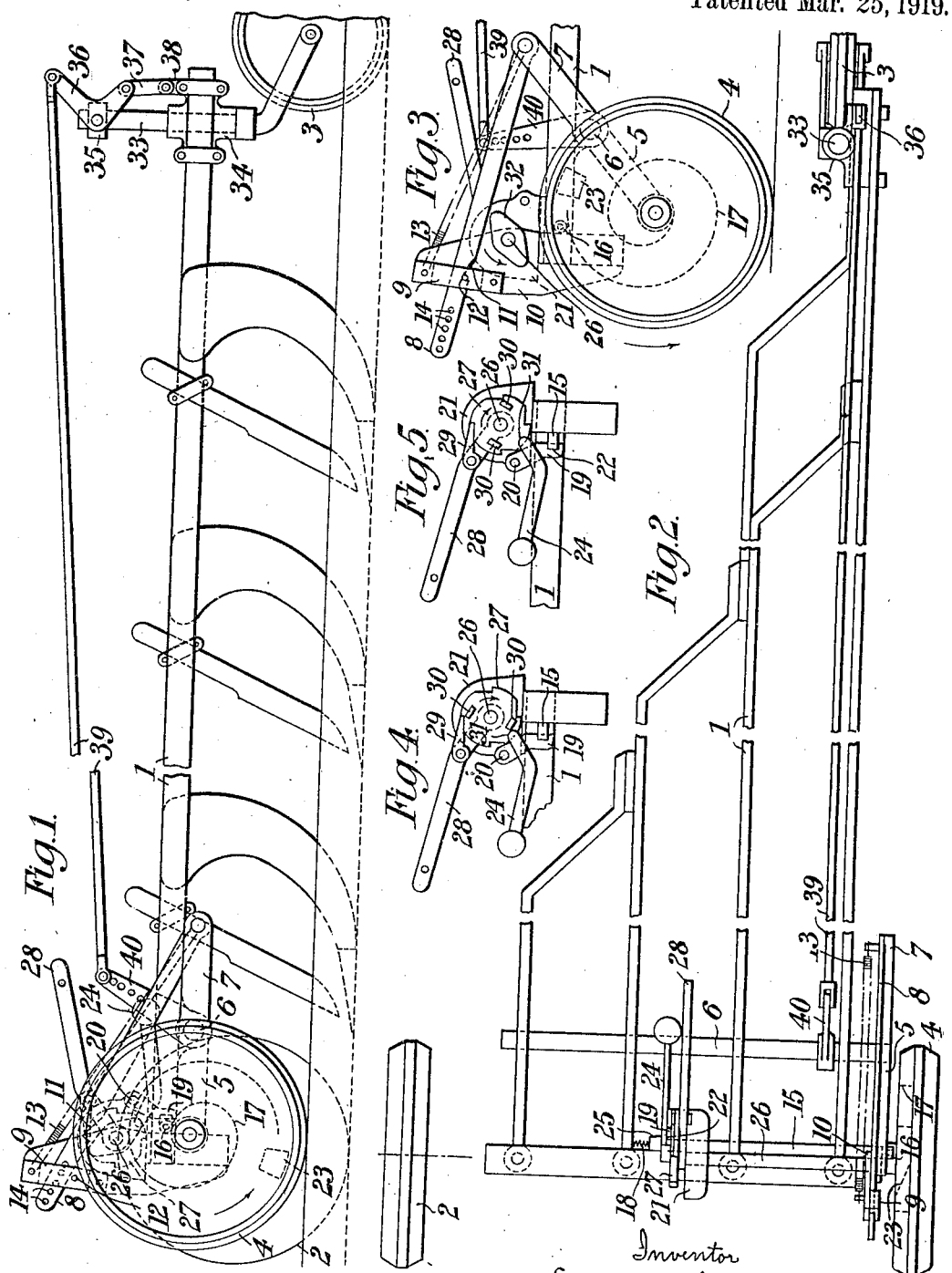
Inventor
Edwin John Goode
by his Attorney

UNITED STATES PATENT OFFICE.

EDWIN JOHN GOODE, OF SAFFRON WALDEN, ENGLAND.

MOTOR PLOW AND CULTIVATOR.

1,298,329.  Specification of Letters Patent.  Patented Mar. 25, 1919.

Application filed July 11, 1918.   Serial No. 244,354.

*To all whom it may concern:*

Be it known that I, EDWIN JOHN GOODE, a subject of His Majesty the King of Great Britain, residing at Elmdon, Saffron Walden, Essex, England, engineer, have invented certain new and useful Improvements in and Relating to Motor Plows and Cultivators; and I do hereby declare the following to be a full, clear, and exact description of the invention, such as will enable others skilled in the art to which it appertains to make and use the same.

This invention relates to motor plows and cultivators and has for its object to provide improved means whereby the main frame and the plows or other tilling implements carried thereby may be automatically lifted while the machine is traveling, as for turning purposes and the like.

According to my invention, the land wheel is mounted on a crank pivotally connected with the main frame. Means, such as a tension rod connected with the crank and adapted to be locked to a fixed member or post on the frame, are provided for holding the said crank in the position which maintains the plow frame elevated, and the automatic lifting of the plow is effected by means of a spiral rib on the land wheel and a coöperating member carried by the plow frame and adapted to be moved into and out of engagement with said rib. The lowering of the plow from the elevated position may be effected by releasing the said tension rod or bar from a catch whereby it is locked to the fixed support or post, thereby permitting the crank to turn on its axis, a suitable spring being provided to prevent shock or jar when the frame is thus lowered.

The member which engages with the spiral rib of the land wheel may consist of a rod slidable transversely of the plow frame and normally held retracted against the stress of a spring, out of engagement with the said rib, by means of a trip lever or catch, and I may provide means whereby this trip lever, and also the locked tension bar, may be released in alternate succession by the step by step rotation of a shaft operated by a lever under the control of the driver.

I will now fully describe my invention and the manner of performing the same, having reference to the annexed drawings in which similar numerals refer to corresponding parts in all the figures, and wherein:—

Figures 1 and 2 show a motor plow in accordance with my invention in side elevation and plan respectively, the main frame being in its lowest position.

Fig. 3 is a side elevation showing the plow frame raised.

Figs. 4 and 5 are detached views of hand operated means for releasing in alternate succession the tension bar and the trip lever which holds retracted the sliding rod which engages the spiral rib of the land wheel. In these figures the positions of the parts are reversed, the plow front being to the right, instead of to the left, as in the other figures.

1 is the main frame of the plow, 2 the furrow wheel, which would preferably be adjustable in the usual manner relatively to the main frame, 3 is the trailing wheel at the rear, and 4 the land wheel.

The land wheel 4 is carried by a stub axle at the extremity of one arm 5 of a two-armed crank fixed to the rock shaft 6 mounted in suitable bearings on the frame 1; to the extremity of the other arm 7 of the crank is pivotally connected the tension bar 8 which passes through a slot provided in a bracket 9 fixed to the side of the post or upright 10 at the front of the main frame. In the underside of the tension bar 8 is a notch 11, and when this notch is in engagement with the pin or catch 12 which traverses the said slot beneath the tension bar, the latter will hold the two-armed crank aforesaid in the position shown in Fig. 3, the land wheel 4 then supporting the frame 1 in its highest position.

13 is a tension spring connecting the post 10 and the end of the member 7 of the two-armed crank, whose function is to avoid shock or jar when the frame 1 is lowered by disengagement of the notch 11 of the tension bar from the catch pin 12. 14 indicates a series of holes in the end of the tension bar 8; a pin may be slipped through one of these holes constituting an adjustable stop when it contacts with the post 10, for limiting the lowering movement of the two-armed crank.

The automatic lifting of the frame 1 from the low to the high position when the machine is traveling, is effected as follows:—

15, Fig. 2, is a rod mounted in suitable bearings so as to be slidable transversely of the frame 1, and having on its outer end an antifriction roller 16, adapted when the rod is moved outwardly, to enter between the convolutions of a spiral rib 17 on the inner side of the land wheel. Normally the rod 15 is held retracted against the stress of a spring 18 by means of a trip lever 19 pivoted at 20, Figs. 4 and 5, to a cheek 21 fixed to the frame 1, said lever engaging a shoulder 22 on the inner end of rod 15. The roller 16 is now clear of the spiral rib 17.

As before explained, the lowering of the frame 1 is effected by simply raising the end of the tension bar 8 to disengage it from the catch pin 12. When it is desired to lift the plow frame, the trip lever 19 is disengaged from the rod 15, which latter is now shot outwardly by the spring 18, so that its roller 16 enters between the convolutions of the spiral rib 17 near the inner end of the latter, as seen in Fig. 1. As the land wheel 4 revolves in the direction of the arrow, the roller 16 moves along the said spiral rib to the outer end thereof, thus gradually raising the frame 1 without shock or jar, until the parts assume the positions shown in Fig. 3.

Fixed to the inner side of the land wheel 4 at or near the end of the spiral rib 17, is an incline 23, which, contacting with the end of the rod 15, pushes the latter inwardly again until it is locked in its normal position by the trip lever 19. The latter has a counterweighted arm 24 which causes it to constantly press against the side of the rod 15, and when the latter is pushed inwardly the incline 25 on its end moves the trip lever outwardly to drop behind the shoulder 22 of rod 15 so soon as it passes it.

Any convenient means adapted to be operated from the driver's seat may be employed for releasing the tension bar 8 and the trip lever 19, but preferably both the tension bar and the trip lever would be released in alternate succession by the step by step rotation of a shaft operated by a pawl carrying lever under the control of the driver, as I will now describe.

A shaft 26 having a bearing at one end in the cheek 21, and near the other end in the post 10, has fixed thereon a four toothed ratchet wheel 27 adapted for step by step rotation by means of the lever 28 pivoting on said shaft and furnished with the pawl or detent 29 engaging said ratchet wheel. On the side face of the ratchet wheel 27 are two tappets 30 diametrically opposite to one another, and adapted, when the ratchet wheel is rotated, to engage the rounded projection 31 on the trip lever 19, and to thereby move the latter out of engagement with rod 15.

When the plow is in the lowered or working position, Fig. 1, the tappets 30 will be positioned as seen in Fig. 4, i. e. a tappet will be just about to contact with the projection 31 of the trip lever. On pulling upward the end of lever 28, as by a cord within reach of the driver, so as to turn the ratchet wheel 27 one tooth space or quarter revolution, this tappet will press back the trip lever 19, disengaging it from the rod 15, which latter then shoots outwardly and engages the spiral rib 17, causing the plow frame to be raised by the rotation of the land wheel 4, as before described. The ratchet wheel 27 will now be in the position shown in Fig. 5, and a cam 32 fixed on the shaft 26 and located immediately beneath the tension bar 8, will have come to the position shown in Fig. 3, i. e. just about to contact with the underside of said tension bar.

If it is now desired to lower the plow, another quarter turn is given the ratchet wheel 27 by means of the lever 28, the cam 32 then lifts tension bar 8 disengaging it from the catch pin 12, and the frame 1 falls as before described, the spring 13 preventing shock or jar. During this last quarter turn of the ratchet wheel there is no contact between a tappet 30 and the trip lever projection 31, and at the end of said quarter turn the ratchet wheel will have again arrived at the position shown in Fig. 4, ready to disengage the trip lever 19 when next turned by lever 28. It will thus be seen that successive quarter turns of the ratchet wheel 27 cause a tappet 30 and the cam 32 to alternately operate their respective mechanisms.

In order to raise and lower the rear end of the plow frame 1 simultaneously with the front end thereof, the spindle 33 of the trailing wheel 3, which is vertically movable in the bearing 34 on the rear of frame 1, is furnished with a rotatable collar 35 to which is pivoted the bell crank lever 36 whereof one arm is pivotally connected with a link 37 in turn pivotally connected with the frame 1, as by the link 38. The other arm of the bell crank lever 36 is connected by the connecting rod 39 with the crank 40 fixed on the rock shaft 6 before described, whereto is fixed the two-armed crank on which the land wheel 4 is mounted. Consequently, when the frame 1 rises or falls relatively to the land wheel 4, the movement of the rock shaft 6 will operate the bell crank lever 36 through the crank 40 and rod 39, and thereby simultaneously raise or lower the trailing wheel relatively to the main frame. The operative throw of the crank 40 would preferably be made adjustable, as seen in Figs. 1 and 3. The mechanism for raising and lowering the trailing wheel does not, *per se*, constitute a part of my invention.

What I claim and desire to secure by Letters Patent of the United States is:—

1. In a plow, the combination of an implement frame, a crank thereon, a land wheel carried by the crank, said wheel provided with a spiral cam lifting rib, means on the frame coöperating with the spiral rib to raise said frame when the land wheel revolves and turn said crank, and means for holding said crank in position to maintain the frame in elevated position.

2. In a plow, the combination of an implement frame, a crank arm supported thereon, a land wheel carried at one end of said crank arm, said wheel provided with a spiral cam lifting rib, a spring pressed rod slidable transversely of said frame and engageable with said rib to raise the frame when the wheel revolves and turn said crank arm, and means for holding said crank arm in position to maintain the frame in elevated position.

3. In a plow, the combination of an implement frame, a crank thereon, a land wheel carried by the crank, said land wheel provided with a spiral cam lifting rib, means on the frame coöperating with the spiral rib to raise said frame when the land wheel revolves and turn said crank, a tension bar connected to said crank, and means coöperable with said tension bar to hold said crank in position to maintain the frame in elevated position.

4. In a plow, the combination of an implement frame, a crank pivoted thereon, a land wheel carried at one end of said crank, said land wheel provided with a spiral cam lifting rib, a tension bar pivoted to the other end of said crank, a rod slidable transversely of said frame and engageable with said rib to raise the frame when the wheel revolves and turn said crank, means for protracting said rod into engagement with said rib, means for holding the rod retracted, a catch for engaging said tension bar to hold the crank in position to maintain the frame in elevated position, and means for alternately releasing the tension bar from its catch and the rod from the means which holds it retracted.

In testimony whereof I have hereunto set my hand in the presence of two witnesses.

EDWIN JOHN GOODE.

Witnesses:
CHARLES RAND,
CHARLES BAKER WALLMAN.

Copies of this patent may be obtained for five cents each, by addressing the "Commissioner of Patents, Washington, D. C."